United States Patent [19]
Kaplan

[11] 3,975,296
[45] Aug. 17, 1976

[54] FREE-FLOWING BLENDS OF HEXA(METHOXYMETHYL)-MELAMINE, CARBON BLACK AND SILICA COMPOUNDS

[75] Inventor: Earl Kaplan, Metuchen, N.J.

[73] Assignee: American Cyanamid Company, Stamford, Conn.

[22] Filed: Dec. 23, 1974

[21] Appl. No.: 535,625

[52] U.S. Cl. .............................. 252/383; 252/385; 252/384
[51] Int. Cl.$^2$............................................. A23L 1/00
[58] Field of Search..................... 252/383, 385, 384

[56] References Cited
UNITED STATES PATENTS

| | | | |
|---|---|---|---|
| 2,882,254 | 4/1959 | Kloepfer et al. | 252/385 X |
| 3,716,493 | 2/1973 | Acker et al. | 252/385 X |

*Primary Examiner*—Stephen J. Lechert, Jr.
*Attorney, Agent, or Firm*—Charles J. Fickey

[57] ABSTRACT

This invention relates to compositions which are free-flowing, non-caking blends of liquid partially etherified methylolated melamines useful as tire cord adhesion promoters; more particularly, blends of liquid methyl ethers of methylolated melamines, carbon black and inert silica fillers.

5 Claims, No Drawings

FREE-FLOWING BLENDS OF HEXA(METHOXYMETHYL)-MELAMINE, CARBON BLACK AND SILICA COMPOUNDS

This invention relates to liquid partially etherified methylolated melamines as tire cord adhesion promoters and to their use in promoting adhesion of rubber to tire cord. More particularly, it relates to free-flowing, non-caking blends of liquid methyl ethers of methylolated melamines, especially hexa(methoxymethyl)melamine, a carbon black and an inert silica filler.

Hexa(methoxymethyl)melamine has been used as a formaldehydedonating component of tire cord adhesion promoting compositions, normally in combination with resorcinol; see, for example, Osborne et al, U. S. Pat. No. 3,522,127. Handling problems are common to the use of liquid partially etherified methylolated melamines, particularly hexa(methoxymethyl)melamine because of their physical form, i.e., viscous liquids, which are difficult to weigh, transfer without loss, etc. This is a problem particularly bothersome to rubber compounders who must accurately weigh and transfer the material to rubber mixing equipment, such as Banbury mixers.

An object of this invention is to provide free-flowing solid forms of these materials to the rubber industry. It is a particular object to provide a solid form of hexa(-methoxymethyl)melamine which will not "cake" on exposure to elevated temperatures, such as are oftentimes encountered in storage facilities.

The applicant has discovered a particular composition, consisting essentially of hexa(methoxymethyl)melamine, carbon black and an inert inorganic silica compound, which is a free-flowing, non-caking solid exhibiting excellent handling characteristics.

In accordance with the present invention, from about 40 to 60 parts by weight of hexa(methoxymethyl)melamine, from about 40 to 60 parts by weight of carbon black and from about 1 to 10 parts by weight of an inert inorganic silica compound are blended to provide a free-flowing, non-caking solid material.

While the invention is particularly directed to blends of hexa(methoxymethyl)melamine, it will be understood that other liquid partially etherified methylolated melamines may be improved in accordance with the teachings herein. Illustrative of liquid partially etherified methylolated melamines useful in promoting tire cord adhesion to rubber are the lower alkyl ethers (said alkyl groups having from 1 to 8 carbon atoms) of tri-, tetra-, penta- and hexamethylol melamines, particularly the penta- and hexamethylolated melamines, and still more particularly the methyl ethers thereof.

In order to provide blends having the desired properties of the present invention, it is important that the carbon black selected has a dibutylphthalate value (DBP value) greater than about 100. DBP value is determined in accordance with ASTM D2414–72. Such carbon blacks are characterized as high structure blacks and they have a relatively large particle size and a low iodine number. Representative carbon blacks useful in the present invention include Continex HAF and SRF-HS (Continental Carbon Co.), Vulcan 6H and Sterling VH (Godfrey L. Cabot Co.) and Statex R (Columbian Carbon Co.), and equivalents thereof.

The finely divided inert inorganic silicas are, preferably, synthetic hydrous calcium silicates containing from about 49–65% silica ($SiO_2$), 19–28% lime (CaO, the remainder being water and small amounts of alumina ($Al_2O_3$), iron oxide ($Fe_2O_3$), magnesia (MgO) and alkalis ($Na_2 O + K_2 O$). They have a surface area, as determined by the standard Brunauer, Emmett and Teller (BET) nitrogen absorption system in the range 40 to 200 $m^2/g$. A preferred silica is sold as Micro Cel E (Johns Manville) and "Silene" (PPG Industries).

Other useful silicas include Hi Sil 233, a synthetic amorphous silicon dioxide powder containing 94% silica/dry basis and a surface area (BET) of 143 $m^2/g$, and Cab-O-Sil, 99.8% silicon dioxide.

In accordance with this invention, the applicant has found that good free-flowing blends of hexa(methoxymethyl)melamine and carbon black result when the dibutylphthalate value of the carbon black is at least about 100. When the DBP value is significantly less than about 100, the blends are paste-like. In a similar way, blends of hexa(methoxymethyl)melamine and carbon black, even when free-flowing, tend to "mass" or compact on standing exposed to elevated temperatures, e.g., about 140°F, which are frequently encountered in storage facilities particularly in warmer climates. This effect is readily overcome by the preparation of blends containing a small amount of one of the inert silica compounds described above.

The blends are readily prepared using any suitable blending equipment. For practical reasons, it is preferred to use blenders which provide intimate contact of the ingredients for fastest production. Such blenders are exemplified by the Littleford-Lodige or Henschel blenders which will provide the blends of this invention in about 3 to 10 minutes. However, other ribbon, twin-shell or double cone blenders will work although they may require longer blending times.

Essentially, the carbon black and silica are charged to the blender and the liquid hexa(methoxymethyl)melamine added thereto and blended until uniformly mixed. The resulting blend is discharged as a free-flowing relatively dustless powder.

A preferred blend contains 45 parts by weight of carbon black, 5 parts by weight of hydrous calcium silicate and 50 parts of hexa(methoxymethyl)melamine per hundred parts, although other blends consisting essentially of 45 weight percent of carbon black, 5 weight percent of silica, and 50 weight percent hexa(-methoxymethyl)melamine are useful. Without departing from the scope of the invention, useful blends can be prepared containing as little as 40 weight percent carbon black or as high as 60 weight percent hexa(methoxymethyl)melamine are useful. Without departing from the scope of the invention, useful blends can be prepared containing as little as 40 weight percent carbon black or as high as 60 weight percent hexa(methoxymethyl)melamine in combination with as little as 1 weight percent to as high as 10 weight percent silica compound.

Further embodiments are shown in the following examples:

EXAMPLE 1

To a Littleford-Lodige blender was charged 45 parts carbon black having a DBP value of 130 (Continex SRF-HS) and 4 parts calcium silicate (Micro Cel E). To this mixture while agitating was added 50 parts hexa(methoxymethyl)melamine. The blend was agitated for about 10 minutes and thereafter discharged from the blender as a free-flowing powder.

When stored for 2 days at 220°F there was no evidence of caking of the blend.

EXAMPLE 2

Following the procedure of Example 1 except for the use of silicon dioxide (Hi Sil 233) instead of Micro Cel E, similar results were obtained.

EXAMPLE 3

Following the procedure of Example 1 except for the use of Continex HAF carbon black having a DBP value of 102 (Continental Carbon Co.) instead of Continex SRF-HS, a similar free-flowing product was obtained.

EXAMPLE 4

Following the procedure of Example 2 except for the use of 49 parts of Continex SRF-HS and 1 part of Hi Sil 233, a free-flowing, non-caking powder was obtained.

EXAMPLE 5

Following the procedure of Example 1, 30 parts of Continex HAF-VHS, having a DBP value of 150, and 10 parts Micro Cel E were charged to a Littleford-Lodige blender. To this was added 60 parts hexa(methoxymethyl)melamine. The blend was agitated for about 10 minutes and discharged from the blender as a free-flowing powder.

EXAMPLE 6

Following the procedure of Example 1, 45 parts of a fine extrusion furnace black, having a DBP value of 66, and 5 parts Micro Cel E were blended with 50 parts of hexa(methoxymethyl)melamine. A heavy paste resulted.

EXAMPLE 7

Following the procedure of Example 1, 45 parts of a semi-reinforcing furnace black, having a DBP value of 60, and 5 parts of Micro Cel E were blended with 50 parts of hexa(methoxymethyl)melamine. A heavy paste resulted.

EXAMPLE 8

Following the procedure of Example 1, except for the use of 5 parts of Cab-O-Sil (99.8% Silicon dioxide) instead of Micro Cel E, a free-flowing powder was obtained.

I claim:

1. A process for improving the physical form of liquid alkyl ethers of methylolated melamines consisting essentially of blending from about 40 to 60 percent by weight of said alkyl ether of methylolated melamine with a carbon black having a dibutylphthalate value of greater than about 100, and from 1 to 10 percent by weight of a finely divided silica compound having a surface area, as determined by the BET nitrogen absorption method, of from about 40 to 200 square meters per gram, selected from synthetic hydrous calcium silicates and synthetic amorphous silicone dioxide.

2. The process of claim 1, wherein said alkyl groups contain from about 1 to 8 carbon atoms.

3. The process of claim 1 wherein said liquid alkyl ether of methylolated melamine is hexa(methoxymethyl)melamine.

4. The process of claim 3 wherein the composition consists essentially of 45 parts carbon black, 5 parts finely divided synthetic hydrous calcium silicate and 50 parts hexa(methoxymethyl)melamine.

5. A free-flowing, non-caking composition as prepared by the process of claim 1.

* * * * *